3,007,940
METHOD OF PREPARING DERIVATIVES OF 3,3-PENTAMETHYLENE-4-HYDROXYBUTYRIC ACID
John Shavel, Jr., Mendham, and Robert I. Meltzer, Rockaway, N.J., and Wolf-Dieter Vigelius, Memmingen, Germany, assignors to Warner-Lambert Pharmaceutical Company, Morris Plains, N.J., a corporation of Delaware
No Drawing. Filed Mar. 1, 1960, Ser. No. 11,987
5 Claims. (Cl. 260—343.6)

This invention relates to a new and novel method of preparing certain derivatives of 3,3-pentamethylene-4-hydroxybutyric acid:

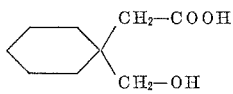

particularly its lactone, $\beta,\beta$-pentamethylenebutyrolactone:

and its salts:

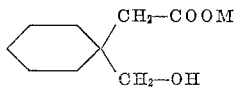

where M is a cation selected from the group consisting of alkali metal, alkaline earth metal, ammonium and amine cations.

Both $\beta,\beta$-pentamethylenebutyrolactone and the salts of 3,3-pentamethylene-4-hydroxybutyric acid are valuable as central nervous system stimulants of high therapeutic index being free from undesirable side effects when administered orally or parenterally. They are especially useful as analeptic agents which may be used for combatting excessive hypnosis after anesthesia or an overdose of barbiturates. The salts of 3,3-pentamethylene-4-hydroxybutyric acid and dosage forms of $\beta,\beta$-pentamethylenebutyrolactone are disclosed in copending applications Ser. Nos. 684,425 and 684,419, both filed September 17, 1957, now matured to U.S. 2,960,441 and U.S. 2,957,805 respectively.

The conventional method for preparing $\beta,\beta$-pentamethylenebutyrolactone as described by Windaus, Ber. 55B, 3981 (1922) involves the conversion of cyclohexanediacetic acid to its di-silver salt followed by reaction of the di-silver salt with iodine in the presence of sand to form the lactone. The lactone may then be converted to the desired salt of 3,3-pentamethylene-4-hydroxybutyric acid by the procedures described in copending application Ser. No. 684,425.

In copending application Ser. No. 824,177, filed July 1, 1959, an improvement in the original Windaus procedure is described wherein the reaction of the di-silver salt with iodine is carried out in an inert aromatic solvent in place of sand. This improvement results in a considerable simplification in manufacturing technique and in an improved yield. Although this improved method results in commercially feasible production of $\beta,\beta$-pentamethylenebutyrolactone and the salts of 3,3-pentamethylene-4-hydroxybutyric acid, it still presents the disadvantage of the original Windaus procedure in that 2 mols of silver are required for every mol of cyclohexanediacetic acid reacted. In view of the high cost of silver, there has been considerable interest in the development of a method whereby this source of cost may be minimized or eliminated.

It is, therefore, a particular object of the present invention to provide a method of preparing derivatives of 3,3-pentamethylene-4-hydroxybutyric acid characterized by high yields and favorable costs.

Other objects and the advantages of this invention will become apparent from the following detailed description.

It has now been found that the desired derivatives of 3,3-pentamethylene-4-hydroxybutyric acid may be prepared from cyclohexanediacetic acid by the following sequence of steps involving the preparation of the following intermediate compounds:

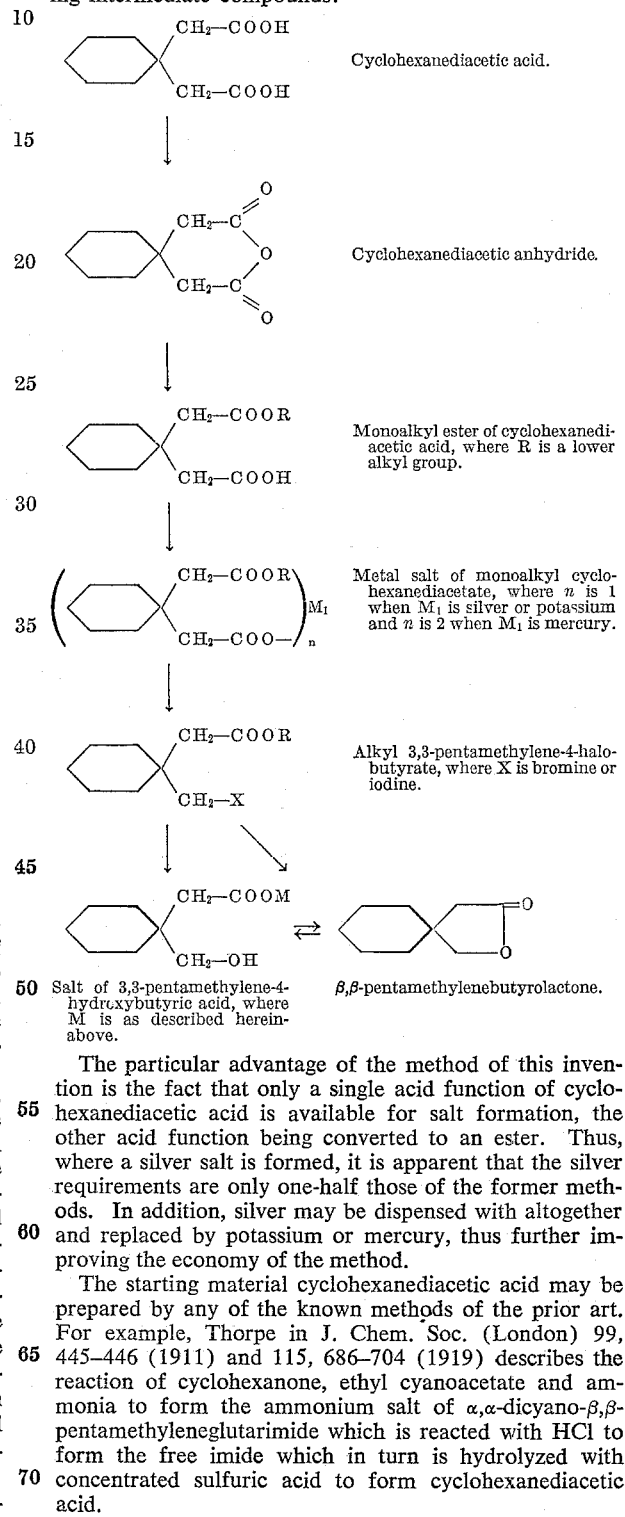

The particular advantage of the method of this invention is the fact that only a single acid function of cyclohexanediacetic acid is available for salt formation, the other acid function being converted to an ester. Thus, where a silver salt is formed, it is apparent that the silver requirements are only one-half those of the former methods. In addition, silver may be dispensed with altogether and replaced by potassium or mercury, thus further improving the economy of the method.

The starting material cyclohexanediacetic acid may be prepared by any of the known methods of the prior art. For example, Thorpe in J. Chem. Soc. (London) 99, 445–446 (1911) and 115, 686–704 (1919) describes the reaction of cyclohexanone, ethyl cyanoacetate and ammonia to form the ammonium salt of $\alpha,\alpha$-dicyano-$\beta,\beta$-pentamethyleneglutarimide which is reacted with HCl to form the free imide which in turn is hydrolyzed with concentrated sulfuric acid to form cyclohexanediacetic acid.

The initial step in the reaction sequence of this invention is the conversion of cyclohexanediacetic acid to its anhydride. This may conveniently be carried out in accordance with known techniques of anhydride formation, for example by refluxing with acetic anhydride or acetyl chloride.

The cyclohexanediacetic anhydride obtained is then converted to the monoalkyl ester of cyclohexanediacetic acid by reaction with a lower alkyl alcohol. The term "lower alkyl" as used herein includes alkyl groups containing 1 to 4 carbon atoms. Such alcohols as methanol, ethanol, n-propanol, isopropanol, n-butanol and the like are suitable to form the corresponding monoalkyl ester of cyclohexanediacetic acid. Methanol is generally preferred. The reaction is carried out by heating a mixture of the anhydride and the alcohol in suitable molecular proportion for a sufficient time to insure complete reaction.

The next step in the reaction sequence of this invention is the conversion of the monoalkyl ester of cyclohexanediacetic acid to its metal salt. It has been found that only the silver, potassium or mercuric salts are satisfactory intermediates since salts of other metals fail to react with bromine or iodine in the succeeding reaction step. Accordingly, the monoalkyl ester of cyclohexanediacetic acid is reacted with a suitable silver, potassium or mercuric compound under conditions such that the desired salt is obtained in a substantially anhydrous form. This is particularly desirable since the subsequent reaction of the salt with bromine or iodine must be carried out under strictly anhydrous conditions.

Silver salts of monoalkyl esters of cyclohexanediacetic acid may be conveniently prepared by reacting in an aqueous medium the monoalkyl ester or its ammonium salt with a water soluble silver salt such as silver nitrate. The desired silver salt of the monoalkyl ester is precipitated from the aqueous reaction medium and may be recovered by filtration and dried.

Potassium or mercuric salts of the monoalkyl esters may be prepared by reacting the monoalkyl ester with for example an oxide or hydroxide of potassium or bivalent mercury in an aqueous or organic solvent reaction medium. Suitable organic solvents include lower alkyl alcohols, for example methanol, and carbon tetrachloride. Where the reaction is carried out in water or a lower alkyl alcohol, the desired potassium or mercuric salt of the monoalkyl ester is recovered by evaporating the reaction mixture to dryness. Where carbon tetrachloride is used as the solvent, the reaction mixture may be concentrated in volume until the water formed in the reaction is removed by azeotropic distillation. Since carbon tetrachloride is a preferred solvent for the subsequent reaction with bromine or iodine, the resulting anhydrous suspension may be used directly without further purification.

The silver, potassium or mercuric salt is then converted to the corresponding alkyl 3,3-pentamethylene-4-halobutyrate by reaction with an equivalent quantity of bromine or iodine at a temperature of about 60° to about 90° C. The reaction is carried out in a suitable solvent for bromine or iodine, carbon tetrachloride being preferred. It is essential that anhydrous conditions be maintained. The silver, potassium or mercuric salt is suspended in the reaction solvent and the mixture heated to expel any residual water present in the salt. Then, a solution of bromine or iodine in a suitable solvent is added at a rate sufficient to maintain the reaction mixture under reflux until an excess has been added as indicated by the characteristic bromine or iodine color remaining in the solution. Where a silver or mercuric salt has been reacted, a precipitate of silver or mercuric halide is formed which is removed by filtration or centrifugation. The liquid phase is treated with dilute caustic solution, for example sodium hydroxide or sodium carbonate to react with any excess halogen. The organic phase is then distilled to remove the reaction solvent leaving a residue constituting the desired alkyl 3,3-pentamethylene-4-halobutyrate.

The alkyl 3,3-pentamethylene-4-halobutyrate is then converted to the desired derivative of 3,3-pentamethylene-4-hydroxybutyric acid. Reaction with an aqueous solution of an alkali metal hydroxide, for example sodium hydroxide or potassium hydroxide forms an aqueous solution of sodium or potassium 3,3-pentamethylene-4-hydroxybutyrate. This solution may be cooled to crystallize the sodium or potassium salt where either one of these salts is the derivative of 3,3-pentamethylene-4-hydroxybutyric acid desired. Alternately, the aqueous solution of the sodium or potassium salt may be acidified, heated, cooled, extracted with an aromatic solvent such as benzene and β,β-pentamethylenebutyrolactone recovered from the extract. The lactone may be used therapeutically as described in copending application Ser. No. 684,419 or may be converted to any desired salt of 3,3-pentamethylene-4-hydroxybutyric acid by reaction with base as described in copending application Ser. No. 684,425. Suitable salts in addition to the sodium and potassium salts include alkaline earth metal salts, for example calcium, magnesium and barium, the ammonium salt, and amine salts, for example piperidine, L-desoxyephedrine and L-ephedrine.

Where the sodium or potassium salt is the desired final product, the mother liquor remaining after crystallization of the salt may be processed as described above to form the lactone which may in turn be converted to the sodium or potassium salt to augment the yield of desired product. Alternately, the initial crystallization of the sodium or potassium salt may be omitted, and the entire reaction product of the halobutyrate ester with sodium or potassium hydroxide may be converted to the lactone which may then be converted to the desired sodium or potassium salt of 3,3-pentamethylene-4-hydroxybutyric acid.

The following examples are included in order further to illustrate the method of the present invention:

EXAMPLE I (a) *Cyclohexanediacetic anhydride*

A quantity of 3.1 grams (0.0155 mol) cyclohexanediacetic acid is heated under vacuum with 9.3 ml. acetic anhydride on a steam bath, heating being continued until all volatile material has been removed. The residue in the reaction vessel is cooled, and 2.9 grams cyclohexanediacetic anhydride, M.P. 55° C. are obtained.

(b) *Monomethyl ester of cyclohexanediacetic acid*

The product from step (a) is heated with 0.75 gram (0.0234 mol) absolute methanol on a steam bath for 6 hours. During the heating all volatile material is removed and the yellowish-brown liquid residue of 3.65 grams of the monomethylester of cyclohexanediacetic acid is obtained.

(c) *Potassium monomethyl cyclohexanediacetate*

The product of step (b) is mixed with a solution of 0.868 gram (0.0155 mol) potassium hydroxide dissolved in 20 ml. methanol. The mixture is heated on a steam bath under vacuum to remove the methanol and the residue is suspended in 80 ml. carbon tetrachloride. The mixture is again heated in a steam bath under vacuum until all volatile material has been removed and the residue is again suspended in 80 ml. carbon tetrachloride. This mixture is heated until 30 ml. carbon tetrachloride have been distilled off leaving an anhydrous suspension of the potassium salt of the monomethylester of cyclohexanediacetic acid.

(d) *Methyl 3,3-pentamethylene-4-bromobutyrate*

To the anhydrous suspension obtained in step (c) is added 0.8 ml. (0.0155 mol) bromine dissolved in 7.2 ml. carbon tetrachloride. The bromine solution is added dropwise with constant stirring of the reaction mixture which is maintained under reflux. The addition of bromine is stopped when it is in excess as indicated by the fact that no further discoloration is observed after 15 minutes of boiling. The reaction mixture is cooled, 15 ml. water are added and the mixture is stirred until all solids are dissolved. 15 ml. of a 10 percent aqueous solution of sodium carbonate is then added and the mixture is stirred, the organic phase is collected, dried over anhydrous sodium sulfate, the drying agent removed by filtration and finally the carbon tetrachloride removed by heating under vacuum on a steam bath. 2.9 grams of a brownish liquid residue constituting methyl 3,3-pentamethylene-4-bromobutyrate is obtained.

(e) β,β-pentamethylenebutyrolactone

The product of step (d) is refluxed for 6 hours with a solution of 2 grams (0.05 mol) sodium hydroxide in 20 ml. water. The mixture is cooled, filtered to remove any solid phase, acidified with hydrochloric acid and heated to 85° C. The solution is again cooled and extracted three times with 10 ml. portions of benzene. The combined benzene extracts are extracted with 10 ml. of a saturated aqueous solution of potassium bicarbonate and the benzene phase is then dried over anhydrous sodium sulfate. The drying agent is removed by filtration and the benzene is removed by vacuum distillation to yield 1.4 grams of a brownish liquid residue comprising the desired β,β-pentamethylenebutyrolactone.

(f) Sodium 3,3-pentamethylene-4-hydroxybutyrate

The lactone obtained in step (e) is heated with a solution of 0.363 gram (0.0091 mol) sodium hydroxide in 5 ml. water and the solution is evaporated to dryness on a steam bath under vacuum. The residue is dissolved in 15 ml. hot isopropanol and the solution is filtered. The filtrate is cooled, the crystals collected, washed with 10 ml. ether and dried for 1 hour at 50° C. A yield of 1.3 grams sodium 3,3-pentamethylene-4-hydroxybutyrate, M.P. 106–108° C. is obtained. The molar yield based on the amount of cyclohexanediacetic acid charged to step (a) is 39.6%.

EXAMPLE II (a) Cylohexanediacetic anhydride 13 grams (0.065 mol) cylohexanediacetic acid is heated with 22 grams acetic anhydride until 10 ml. liquid has distilled off at normal atmospheric pressure. The reaction mixture is cooled and allowed to stand overnight and the crystals are then separated and repulped with 10 ml. of a mixture of 5 parts petroleum ether and 1 part benzene. The filtrate remaining after removal of the crystals is heated on a steam bath under vacuum to remove residual acetic anhydride and is then cooled. An additional yield of crystals is obtained which is recrystallized from a mixture of petroleum ether and benzene. The two batches of crystals constituting cyclohexanediacetic anhydride weight a total of 11.05 grams.

(b) Silver monomethyl cyclohexanediacetate

The product from step (a) is heated with 2.9 grams methanol on a steam bath for 5 hours after which a mixture of 200 ml. water and 4.7 ml. 24% aqueous ammonia is added. A solution of 10.3 grams silver nitrate in 30 ml. water is then added under efficient stirring. The precipitate which forms is separated on a centrifuge, repulped in 120 ml. water, centrifuged again and the solids are dried in the dark for 8 days at 60° C. A quantity of 18.3 grams of the silver salt of monomethyl cyclohexanediacetate is obtained.

(c) Sodium 3,3-pentamethylene-4-hydroxybutyrate

The silver salt obtained in step (b) is suspended in 190 grams carbon tetrachloride and the mixture is heated on a steam bath until 50 ml. carbon tetrachloride has distilled off. To the resulting anhydrous suspension of the silver salt in carbon tetrachloride is added dropwise a solution of 9.1 grams bromine dissolved in 3 ml. carbon tetrachloride. The bromine solution is added at such a rate that the reaction mixture remains boiling and the addition is stopped when there is an excess of bromine in the reaction mixture as indicated by the presence of the characteristic bromine color. Heating is continued for 30 minutes after which the mixture is cooled, the clear supernatant removed by decantation and the precipitate constituting silver bromide is separated on a centrifuge. The silver bromide is repulped with 15 ml. carbon tetrachloride and centrifuged again. The combined liquid phases are extracted repeatedly with 6 ml. of a 10% aqueous sodium hydroxide solution until the solution is clear. The organic phase is separated and distilled under vacuum to remove the volatile solvent. The residue is then heated for 6 hours at 95° C. with a solution of 8.2 grams of sodium hydroxide in 30 ml. water. The mixture is cooled to 10° C. and maintained at this temperature for 24 hours. The crystals constituting sodium 3,3-pentamethylene-4-hydroxybutyrate are separated on a centrifuge.

The mother liquor is treated with 5 ml. 12 N HCl, heated to 85° C., cooled and extracted with 2 ml. benzene to form a first benzene extract. The separated crystals of the sodium salt are recrystallized from a mixture of 2 parts n-butanol and 3 parts benzene. The mother liquor from the recrystallization is evaporated under vacuum to dryness, the residue suspended in 3 ml. water acidified with 1.5 ml. concentrated HCl, heated to 85° C., cooled and extracted with 1 ml. benzene to form a second benzene extract.

The two benzene extracts are combined and treated with a 20% solution of potassium carbonate, the organic phase is separated, the solvent is evaporated by distillation and the residue is distilled under vacuum to yield β,β-pentamethylenebutyrolactone having a boiling point of 138 to 141° C. at 14 millimeters of mercury.

The lactone is dissolved in an equivalent amount of 20% aqueous sodium hydroxide, the mixture is evaporated to dryness under vacuum and the solids recrystallized from a mixture of 2 parts n-butanol and 3 parts benzene to yield sodium 3,3-pentamethylene-4-hydroxybutyrate.

The two batches of the sodium salt are combined, repulped with two 25 ml. portions of ether and dried at 50° C. for 14 hours. A quantity of 7.72 grams (0.0364 mol) of the sodium salt is obtained which represents a molar yield based on the amount of cyclohexanediacetic acid charged to step (a) of 56%.

EXAMPLE III

A quantity of 10.7 grams (0.05 mol) of the monomethyl ester of cyclohexanediacetic acid, prepared by the procedure described in Example I (a) and (b) is dissolved in 500 ml. carbon tetrachloride and to the resulting solution is added 5.4 grams (0.025 mol) mercuric oxide. The reaction mixture is boiled for 7 hours to yield a clear solution of the mercuric salt of the monomethyl ester of cyclohexanediacetic acid with a volume of about 250 ml.

To the resulting clear solution is added, with stirring, 5 ml. of a solution of one volume bromine in one volume of carbon tetrachloride (corresponding to 0.05 mol bromine). The precipitated mercuric bromide is separated by filtration and washed with 5 ml. carbon tetrachloride. The filtrate and wash liquor are combined and stirred with successive portions of an aqueous 10% sodium carbonate solution until the aqueous phase remains alkaline. The organic phase is then distilled under vacuum to remove all volatile solvent.

The distillation residue is boiled for 10 hours with 45 ml. 20% sodium hydroxide solution. The mixture is cooled, acidified with concentrated HCl, heated to 90° C., cooled and then extracted with two 10 ml. portions of benzene. The benzene extracts are combined, extracted with a 10% aqueous sodium carbonate solution to remove acidic components, dried over anhydrous sodium sulfate and distilled under vacuum.

A yield of 3.9 grams (0.025 mol) of β,β-pentamethylenebutyrolactone is obtained. This represents a molar yield of 50% based on the amount of the monomethyl ester of cyclohexanediacetic acid. The lactone may be converted to any desired salt of 3,3-pentamethylene-4-hydroxybutyric acid by the procedure described in copending application Ser. No. 684,425.

The foregoing examples illustrate the preparation of derivatives of 3,3-pentamethylene-4-hydroxybutyric acid, specifically its lactone and its sodium salt by the method of this invention. In Example I the potassium salt of monomethyl cyclohexanediacetate is obtained as an intermediate, while in the method of Example II, the corresponding silver salt is obtained. In Example III, the corresponding mercuric salt is obtained. In Example I it is apparent that the lactone which is obtained as an intermediate may, if desired, be converted to salts of 3,3-pentamethylene-4-hydroxybutyric acid other than the sodium salt as described in copending application Ser. No. 684,425.

This application is a continuation-in-part of copending application Ser. No. 860,069, filed December 17, 1959, now abandoned.

It is understood that the foregoing detailed description is given merely by way of illustration and that many variations may be made therein without departing from the spirit of our invention.

Having described our invention, what we desire to secure by Letters patent is:

1. A method of preparing derivatives of 3,3-pentamethylene-4-hydroxybutyric acid which comprises converting cyclohexanediacetic acid to cyclohexanediacetic anhydride, reacting said anhydride with a lower alkyl alcohol to form a mono-lower alkyl ester of cyclohexanediacetic acid, converting said ester to its salt of a metal selected from the group consisting of silver, potassium and bivalent mercury, reacting said metal salt with a halogen selected from the group consisting of bromine and iodine to form the corresponding lower alkyl 3,3-pentamethylene-4-halobutyrate and reacting said substituted 4-halobutyrate with a base selected from the group consisting of sodium hydroxide and potassium hydroxide.

2. A method according to claim 1 werein the reaction product of said substituted 4-halobutyrate with said base is acidified to form β,β-pentamethylenebutyrolactone.

3. A method of preparing a salt of 3,3-pentamethylene-4-hydroxybutyric acid selected from the group consisting of the sodium and potassium salts which comprises reacting cyclohexanediacetic acid with acetic anhydride to form cyclohexanediacetic anhydride, reacting said cyclohexanediacetic anhydride with methanol to form the monomethyl ester of cyclohexanediacetic acid, reacting said monomethyl ester with silver nitrate to form the silver salt of monomethyl cyclohexanediacetate, reacting said sliver salt with bromine to form methyl 3,3-pentamethylene-4-bromobutyrate and reacting said 4-bromobutyrate with a base selected from the group consisting of sodium hydroxide and potassium hydroxide to form said salt of 3,3-pentamethylene-4-hydroxybutyric acid.

4. A method of preparing a salt of 3,3-pentamethylene-4-hydroxybutyric acid selected from the group consisting of the sodium and potassium salts which comprises reacting cyclohexanediacetic acid with acetic anhydride to form cyclohexanediacetic anhydride, reacting said cyclohexanediacetic anhydride with methanol to form the monomethyl ester of cyclohexanediacetic acid, reacting said monomethyl ester with potassium hydroxide to form the potassium salt of monomethyl cyclohexanediacetate, reacting said potassium salt with bromine to form methyl 3,3-pentamethylene-4-bromobutyrate and reacting said 4-bromobutyrate with a base selected from the group consisting of sodium hydroxide and potassium hydroxide to form said salt of 3,3-pentamethylene-4-hydroxybutyric acid.

5. A method of preparing a salt of 3,3-pentamethylene-4-hydroxybutyric acid selected from the group consisting of the sodium and potassium salts which comprises reacting cyclohexanediacetic acid with acetic anhydride to form cyclohexanediacetic anhydride, reacting said cyclohexanediacetic anhydride with methanol to form the monomethyl ester of cyclohexanediacetic acid, reacting said monomethyl ester with mercuric oxide to form the mercuric salt of monomethyl cyclohexanediacetate, reacting said mercuric salt with bromine to form methyl 3,3-pentamethylene-4-bromobutyrate and reacting said 4-bromobutyrate with a base selected from the group consisting of sodium hydroxide and potassium hydroxide to form said salt of 3,3-pentamethylene-4-hydroxybutyric acid.

References Cited in the file of this patent

Windaus: Berichte, V. 55B, p 3981 (1922).